Figure 1A:
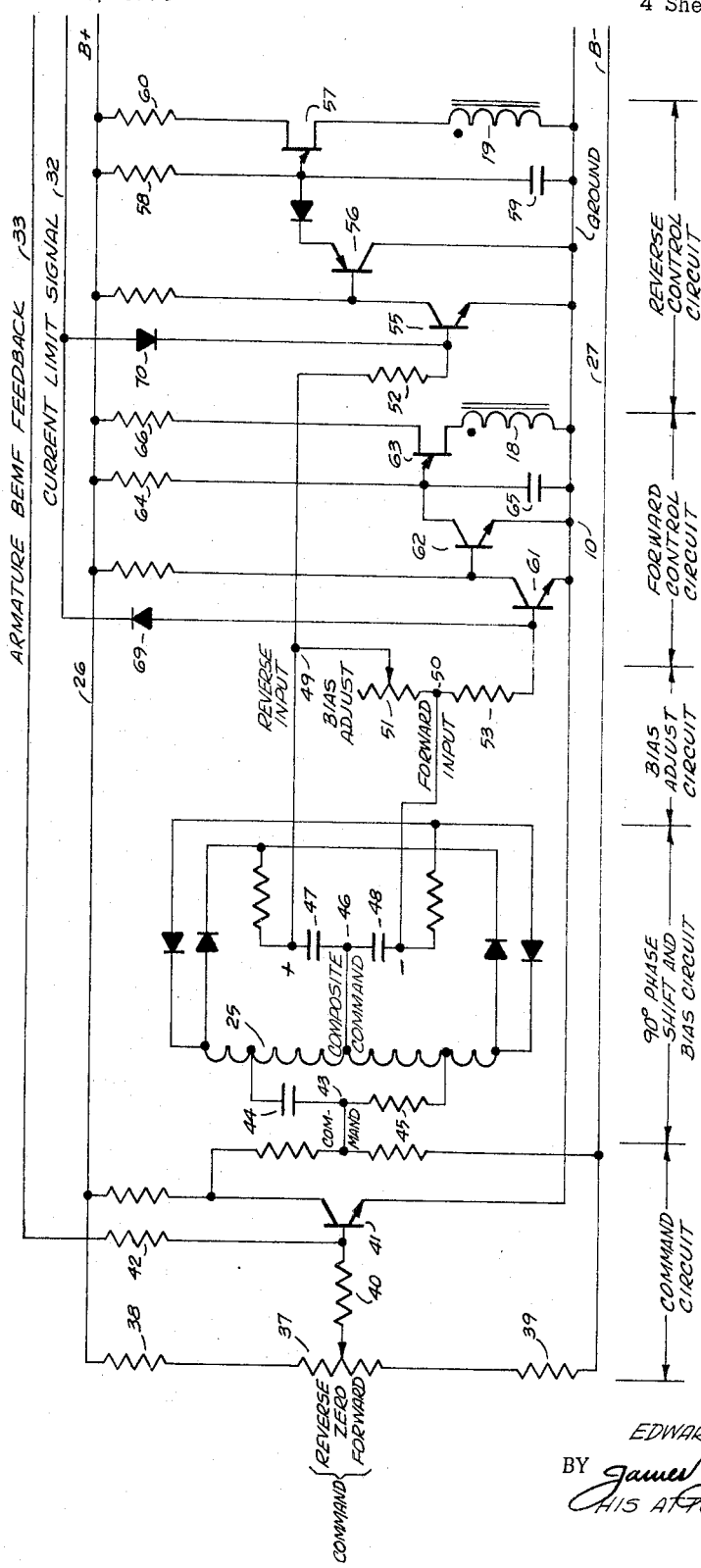

INVENTOR.
EDWARD H. DINGER
BY James J. Williams
HIS ATTORNEY

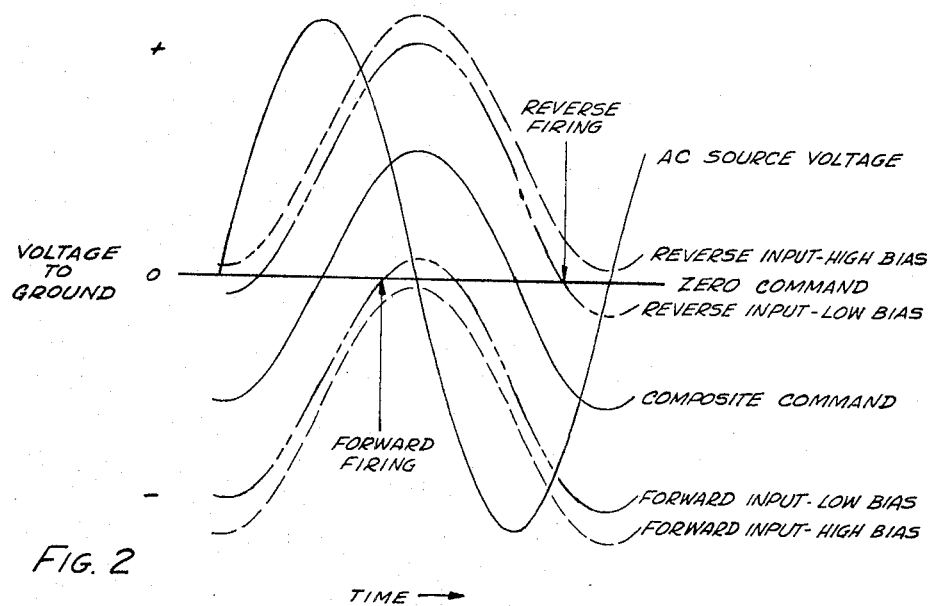
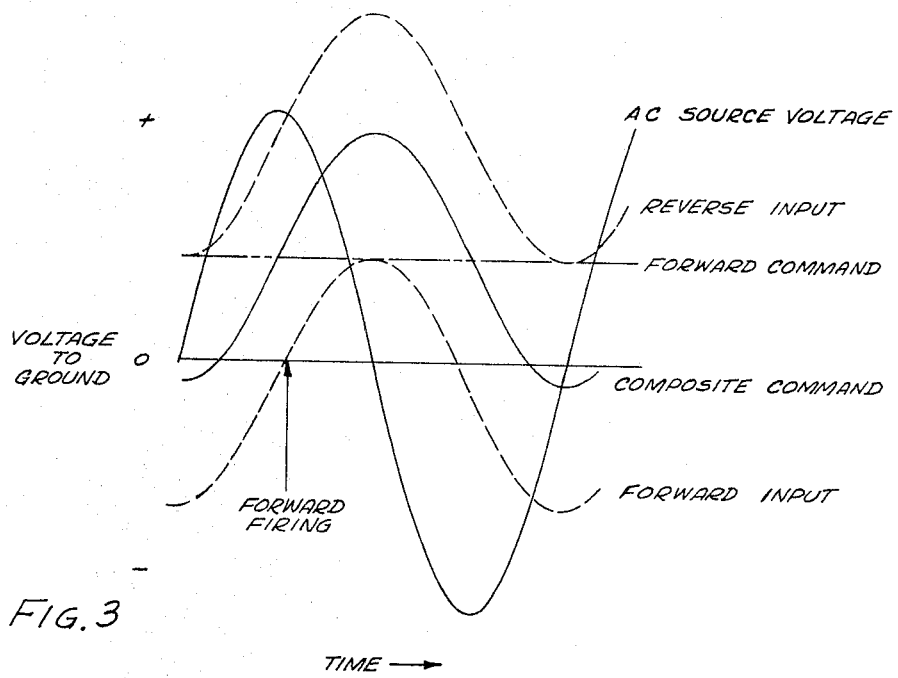

United States Patent Office 3,283,234
Patented Nov. 1, 1966

3,283,234
CONTROL FOR REVERSIBLE MOTOR WITH INSTANTANEOUS CURRENT LIMIT
Edward H. Dinger, Waynesboro, Va., assignor to General Electric Company, a corporation of New York
Filed Jan. 10, 1964, Ser. No. 337,052
8 Claims. (Cl. 318—331)

The invention relates to a motor control circuit, and particularly to a motor control circuit for a reversible direct current motor.

Since the introduction of improved static devices for controlling current, direct current motors have been used in more applications. Such applications are preferably provided with a control circuit that operates from a 60 cycle alternating current source, and that controls both the speed and direction of rotation of the direct current motor.

Accordingly, an object of the invention is to provide a new and improved direct current motor control circuit.

Another object of the invention is to provide an improved direct current motor control circuit that can operate from an alternating current source and that controls the speed and direction of rotation of a direct current motor.

Another object of the invention is to provide an improved direct current motor control circuit that controls the speed and direction of rotation of a direct current motor and that can be used either with or without a closed loop feedback circuit.

While the static devices for controlling current have many desirable characteristics, the static devices are sensitive to excess currents, such as a motor starting current.

Accordingly, another object of the invention is to provide an improved direct current motor control circuit that can limit the current supplied to the motor to a predetermined magnitude for all rotational speeds of the motor from starting to maximum speed.

Briefly, these and other objects are achieved in accordance with the invention by a circuit that combines a command signal indicative of the desired direction and speed of motor rotation with a phase shifted alternating current signal to produce a composite command signal. The composite command signal is combined with negative and positive bias to produce forward and reverse input signals. The forward and reverse input signals control a static device or devices that supply forward and reverse currents to the motor. A current limit signal indicative of the actual direction and speed of motor rotation can be inserted at an appropriate place to override or control the forward and reverse input signals and permit no more than a predetermined magnitude of average current to be supplied to the motor. Also, a feedback signal indicative of the direction and speed of motor rotation can be combined with the command signal to give closed loop operation.

Figure 1B:
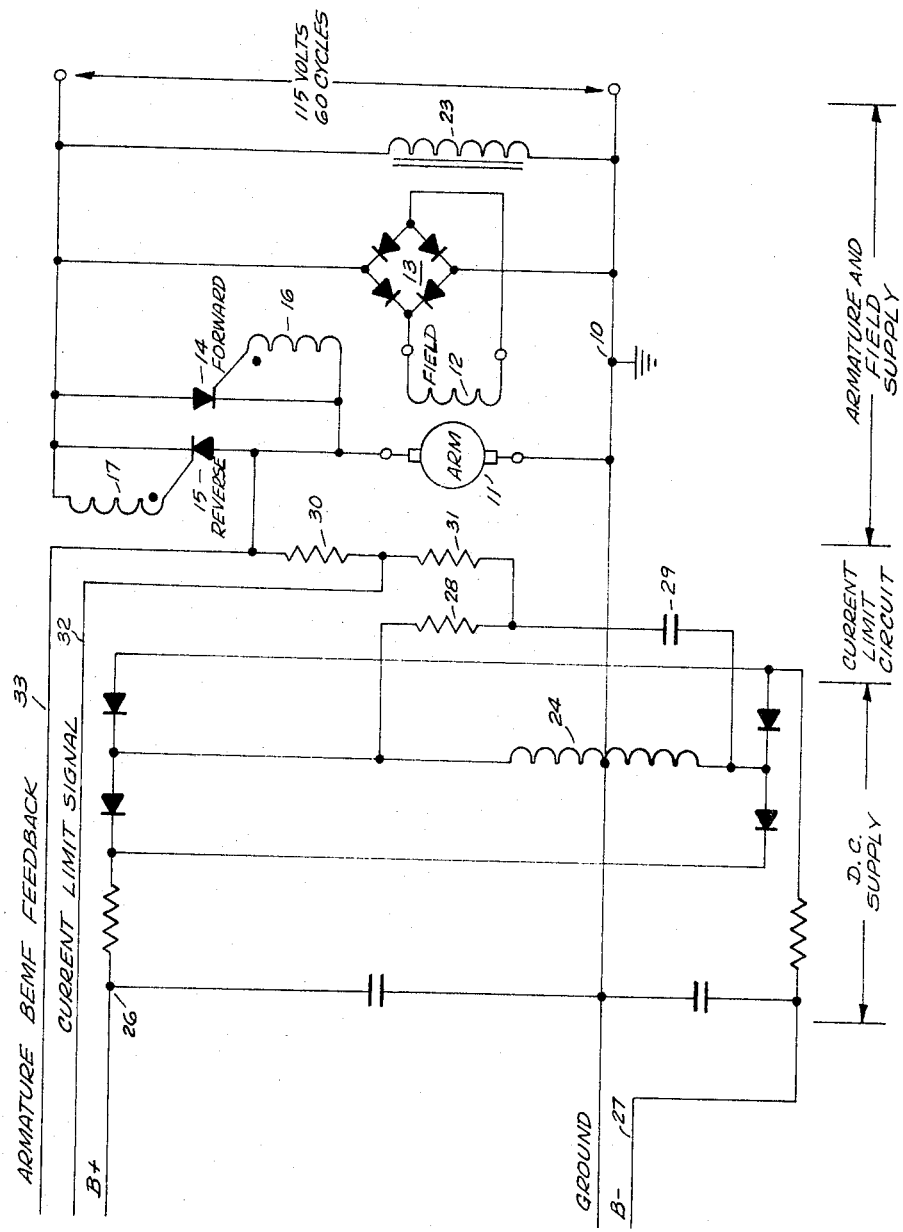

The invention is particularly pointed out in the claims. The invention may be better understood from the following description given in connection with the accompanying drawing, in which:

FIGURES 1a and 1b show a schematic diagram of a preferred embodiment of a motor control circuit in accordance with the invention; and FIGURES 2, 3, 4, and 5 show waveforms for explaining the operation of the motor control circuit of FIGURES 1a and 1b.

In the following description, the motor control circuit will first be described, and then the operation of the motor control circuit will be described.

*Circuit description*

FIGURES 1a and 1b show a schematic diagram of a preferred embodiment of the motor control circuit. FIGURES 1a and 1b are to be considered as being connected together through common leads at the right and left edges respectively. The motor control circuit operates from any suitable alternating current source such as the 115 volt, 60 cycle source indicated in FIG. 1b. One side of this alternating current source may be connected to a reference or ground bus 10. The direct current motor to be controlled by the motor control circuit comprises an armature 11 and a shunt field 12. The field 12 is supplied with direct current provided by a full wave bridge rectifier 13 coupled across the alternating current source. The armature 11 is supplied with forward and reverse direct current provided by forward and reverse silicon controlled rectifiers 14, 15. These control rectifiers 14, 15 are known in the art, and supply an anode-cathode current in response to a suitable current supplied between their gate electrodes and cathodes. The anode-cathode path of the forward control rectifier 14 is coupled in series with the armature 11 to conduct current in the arbitrarily designated forward direction, and the anode-cathode path of the reverse control rectifier 15 is coupled in series with the armature 11 to conduct current in the arbitrarily designated reverse direction. Secondary transformer windings 16, 17 of pulse transformers are respectively coupled between the gate electrodes and cathodes of the forward and reverse control rectifiers 14, 15. The secondary winding 16 is coupled to a primary winding 18, and the secondary winding 17 is coupled to a primary winding 19. The primary windings 18, 19 of the pulse transformers are in the forward and reverse control circuits indicated in FIGURE 1a. (Corresponding polarities are indicated by the dots adjacent the windings. For example, when the dotted end of the primary winding 18 is positive, the dotted end of the associated secondary winding 16 is also positive.)

A primary winding 23 of a supply transformer is also coupled across the alternating current source. A tapped secondary winding 24 (shown in the D.C. supply circuit in FIGURE 1b) and a tapped secondary winding 25 (shown in the phase shift and bias circuit in FIGURE 1a) are coupled to this primary winding 23. The center tap of the secondary winding 24 is coupled to the ground bus 10, and the upper and lower ends of the secondary winding 24 are coupled to a full wave rectifier and filter arrangement. This rectifier and filter arrangement provides positive direct current on a B+ bus 26 and a negative direct current on a B− bus 27.

A current limit circuit is provided to limit the average current through the forward and reverse control rectifiers 14, 15 to any predetermined magnitude. The current limit circuit includes a phase shift circuit having a resistor 28 and a capacitor 29 coupled in series across the secondary winding 24. An alternating current voltage, having a phase shifted by preferably but not necessarily ninety degrees with respect to the phase of the alternating current source, is provided at the junction of the resistor 28 and the capacitor 29. This phase shifted voltage is coupled to a voltage divider comprising two resistors 30, 31 which are coupled in series between the upper terminal of the armature 11 and the junction of the resistor 28 and the capacitor 29. The junction of the resistors 30, 31 is coupled to a current limit signal bus 32 which is coupled to the forward and reverse control circuits in FIGURE 1a. The current limit signal includes the phase shifted alternating current voltage and a portion of the back electromotive force signal on the upper terminal of the armature 11. The upper terminal of the armature 11 is also coupled to an armature back electromotive force feedback bus 33 which is coupled to the command circuit in FIG. 1a.

In FIGURE 1a, command signals are supplied by the movable tap of a command potentiometer 37. The command potentiometer 37 is coupled through limiting resistors 38, 39 to the B+ bus 26 and the B— bus 27. These command signals are direct current signals having a polarity and magnitude indicative of the command either with or without the feedback signals provided on the feedback bus 33. A zero command is provided by the movable tap being substantially centered on the command potentiometer 37. Forward commands are provided by the movable tap being moved downward, and reverse commands are provided by the movable tap being moved upward. Signals on the feedback bus 33 may or may not be combined with the command signal from the command potentiometer 37 depending upon whether open or closed loop operation is desired. The movable tap of the command potentiometer 37 is coupled through a resistor 40 to the base electrode of a sense reversing transistor 41 of the NPN type. The base electrode of the transistor 41 is also coupled through a resistor 42 to the feedback bus 33. A network of three resistors is coupled between the B+ bus 26 and B— bus 27. The collector of the sense reversing transistor 41 is coupled to the junction of the upper and middle resistors, and the emitter of the transistor 41 is coupled to the ground bus 10. Command signals are dreived from a command bus 43 which is coupled to the junction of the middle and lower resistors.

The command signals on the command bus 43 are combined with an alternating current signal having a phase which is shifted with respect to the phase of the alternating current signal source. A phase shifting network, comprising a capacitor 44 and a resistor 45, is coupled in series between intermediate taps of the secondary winding 25. The junction of this capacitor 44 and resistor 45 is coupled to the command bus 43. It is preferable, but not essential, that this phase shifted signal be delayed by an angle of approximately ninety degrees. The direct current magnitude of the command signal and the phase shifted alternating current signal are combined and appear as a composite command signal on the center tap of the secondary winding 25. The center tap is coupled to a composite command bus 46.

A direct current bias is adder to the composite command signal in both equal positive and negative directions. This bias is provided by a full wave rectifier and by a resistor and capacitor filter coupled between the ends of the secondary winding 25 and its center tap, or the composite command bus 46. This bias appears across capacitors 47, 48, and has the indicated polarities. This bias provides a reverse input signal and a forward input signal on respective buses 49, 50. The reverse input signal is the positively biased composite command signal and the forward input signal is the negatively biased composite command signal. The positive and negative biases are equal, and have a magnitude determined by the setting of a single bias adjust potentiometer 51 which is coupled between the reverse and forward input signal buses 49, 50.

The reverse input signal on the bus 49 is coupled through a resistor 52 to the reverse control circuit. The reverse control circuit comprises an NPN type transistor 55, a PNP type transistor 56, and a unijunction type transistor 57. The transistor 55 amplifies the reverse input signals, and the transistor 56 controls oscillations provided by a known oscillator comprising the unijunction transistor 57, resistors 58, 60, a capacitor 59, and the primary winding 19. If the transistor 55 is conducting, the transistor 56 also conducts. With the transistor 56 conducting, the capacitor 59 is shunted so that it cannot charge. If the capacitor 59 cannot charge, no oscillations take place and no current is supplied to the primary winding 19. But, if the transistor 55 is nonconducting, the transistor 56 is also nonconducting and the capacitor 59 may charge. When the capacitor 59 charges to a predetermined magnitude (at a rate dependent on circuit values), it causes a pulse of current to flow from the emitter to the lower base of the unijunction transistor 57 and through the primary winding 19 from the dotted end toward the undotted end. This winding 19 is coupled to the secondary winding 17 in FIGURE 1b and supplies a current from the dotted end of the secondary winding 17 through the gate electrode-cathode circuit of the reverse control rectifier 15. If the anode of the control rectifier 15 is positive relative to its cathode, this current causes the control rectifier 15 to conduct and supply reverse armature current. It is preferable that the charging rate of the capacitor 59 be sufficiently fast so that current pulses are supplied to the primary winding 19 at a rate that is ten to twenty times the frequency of the alternating current source voltage. This relatively high rate provides a pulse of current a short time after the control circuit becomes operative, and supplies additional pulses in case the first pulse fails to cause the control rectifier 15 to conduct.

The forward control circuit is similar. The forward input signal on the bus 50 is coupled through a resistor 53 to the forward control circuit. The forward control circuit comprises two NPN type transistors 61, 62 and a unijunction type transistor 63. The transistor 61 amplifies the forward input signals, and the transistor 62 controls oscillations provided by another oscillator comprising the unijunction transistor 63, resistors 64, 66, a capacitor 65, and the primary winding 18. If the transistor 61 is nonconducting, the transistor 62 is conducting. With the transistor 62 conducting, the capacitor 65 is shunted so that it cannot charge. If the capacitor 65 cannot charge, no oscillations take place and no current is supplied to the primary winding 18. But if the transistor 61 is conducting, the transistor 62 is nonconducting and the capacitor 65 may charge. When the capacitor 65 charges to a predetermined magnitude (at a rate dependent on circuit values), it causes a pulse of current to flow from the emitter to the lower base of the unijunction transistor 63 and through the primary winding 18 from the dotted end toward the undotted end. This winding 18 is coupled to the secondary winding 16 in FIGURE 1b and supplies a current from the dotted end of the secondary winding 16 through the gate electrode-cathode circuit of the forward control rectifier 14. This permits the control rectifier 14 to conduct and supply forward armature current. The charging rate of the capacitor 65 is substantially the same as the rate of the capacitor 59 in the reverse control circuit.

The base electrode of the transistor 61 in the forward control circuit is coupled through the anode-cathode path of a diode 69 to the current limit signal bus 32. The base electrode of the transistor 55 in the reverse control circuit is coupled through the cathode-anode path of a diode 70 to the current limit signal bus 32. The current limit signal bus 32 presents a relatively low impedance circuit to the forward and reverse control circuits so that the signal on the current limit signal bus 32 predominates, at predetermined times determined by the circuit values and diodes 69, 70, over signals supplied by the reverse and forward input signal buses 49, 50. If the current limit signal bus 32 is relatively negative, the transistor 61 is held nonconducting and no forward armature current can flow. The transistor 55 may be controlled by the reverse input signal bus 49 when the diode 70 is reversed biased. If the current limit signal bus 32 is relatively positive, the transistor 55 is held conducting and no reverse armature current can flow. The transistor 61 may be controlled by the forward input signal bus 50 when the diode 69 is reversed biased. In other words, the polarity and potential of the current limit signal bus 32 determines whether the forward and reverse input signals are passed or blocked in the control circuit.

Circuit operation

The circuit operation will be described in connection with the voltage-time waveforms shown in FIGURES 2, 3, 4, and 5. These waveforms show certain voltages in the circuit of FIGURES 1a and 1b with respect to ground.

FIGURE 2 shows various voltages with respect to ground for a zero command signal. It has been assumed that the movable tap on the command potentiometer 37 is positioned at its mid-point for a zero motor speed. Under this condition, the composite command signal on the composite command bus 46 oscillates about a zero level. Therefore, the composite command signal varies equally above and below zero. FIGURE 2 shows two conditions of forward and reverse input signals. The first condition is for forward and reverse input signals with a high amount of bias added as shown by the dashed lines. For a high bias, it will be noted that the reverse input waveform never goes down to zero, but is always at some positive voltage with respect to ground; while the forward input waveform never rises up to zero, but is always at some negative potential with respect to ground. In the reverse control circuit, the transistor 55 is held conducting, the transistor 56 is also held conducting, and no current flows through the primary winding 19. In the forward control circuit, the transistor 61 is held nonconducting, the transistor 62 is held conducting, and no current flows through the primary winding 18. With no current supplied to either primary winding 18, 19, the control rectifiers 14, 15 do not conduct, no armature current is supplied, and the motor is stationary.

Actually, it may be desirable that for a zero command speed a slight amount of armature current should flow in both directions so that the armature 11 tends to oscillate slightly about a zero speed position. This slight motion of the armature 11 provides a slight momentum so that when a speed is desired, it is not necessary to wait for the armature inertia to be overcome. Therefore, the bias adjust potentiometer 51 is reduced in impedance (this reduces the bias) so that the reverse and forward input signals approach the composite command signal. (The reverse and forward input signals can be made coincident with the composite command signal if the bias is reduced to zero. This would be obtained by zero impedance in the bias adjust potentiometer 51.) This low bias is illustrated by the dashed and dotted line waveforms in FIGURE 2 for the reverse input and forward input signals. It will be seen that the reverse input signal for a low bias goes slightly negative near the end of a negative half cycle of alternating current source voltage, and that the forward input signal goes slightly positive near the end of a positive half cycle of alternating current source voltage. This provides a slight amount of forward and reverse armature current. When the forward input signal becomes positive, the transistor 61 conducts, the transistor 62 becomes nonconducting, and the forward control circuit supplies a current pulse to the primary winding 18. This causes the forward control rectifier 14 to fire and supply forward armature current as indicated. It will be noted that the alternating current source voltage has the proper polarity, namely positive with respect to the ground bus 10, so that the forward control rectifier 14 may conduct. In the next and negative half cycle of the alternating current source voltage, the reverse input signal becomes slightly negative near the end of this half cycle so that the transistor 55 becomes nonconducting. This causes the transistor 56 to also become nonconducting, and the reverse control circuit supplies a current pulse to the primary winding 19. This causes the reverse control rectifier 15 to fire and supply reverse armature current as indicated. It will be noted that the alternating current source voltage has the proper polarity, namely negative with respect to the ground bus 10, so that the reverse control rectifier 15 may conduct. FIGURE 2 shows the phase relation of of the alternating current source voltage and the phase shifted composite command signal, and forward and reverse input signals. A phase delay of approximately ninety degrees provides a good range of control between zero speed and maximum speed.

FIGURE 3 shows waveforms where a forward command signal is provided. This forward command signal is provided by the movable tap of the command potentiometer 37 being moved downward. This causes the sense reversing transistor 41 to conduct less and cause the command signal bus 43 to become more positive as indicated by the dashed and dotted straight line above or in the positive direction with respect to the zero axis. The composite command signal varies about this forward command signal, and the forward and reverse input signals are biased below and above the composite command signal. It will be seen that the reverse input signal never reaches zero or a negative value so that no reverse armature current flows. However, the forward input signal reaches zero and becomes positive at a relatively early point in the positive half cycle of the alternating current source voltage so that the forward control rectifier 14 is fired relatively early in the positive half cycle of the alternating current source voltage. This provides forward armature current at the indicated time.

Figure 4:
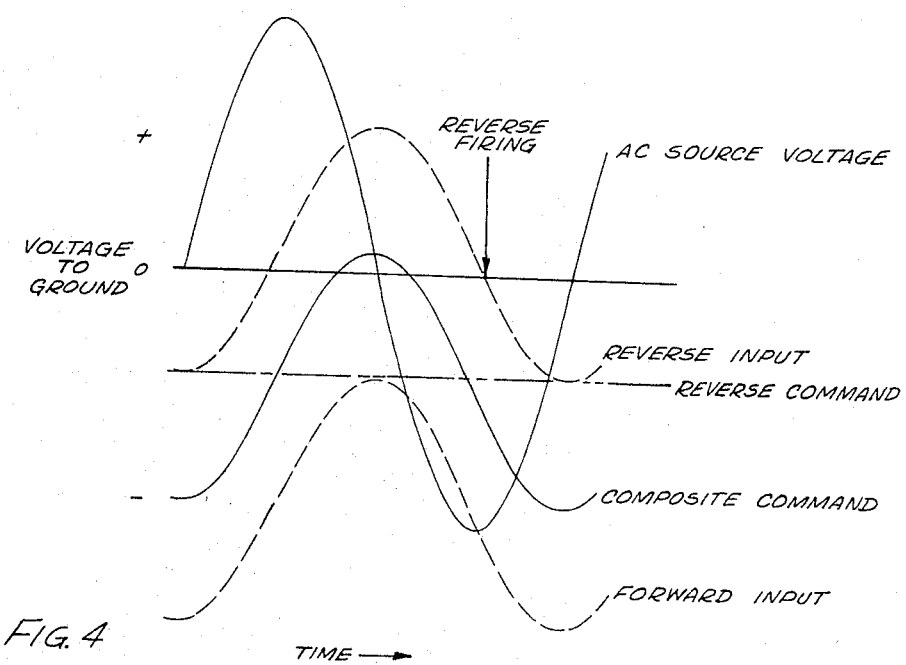
Figure 5:
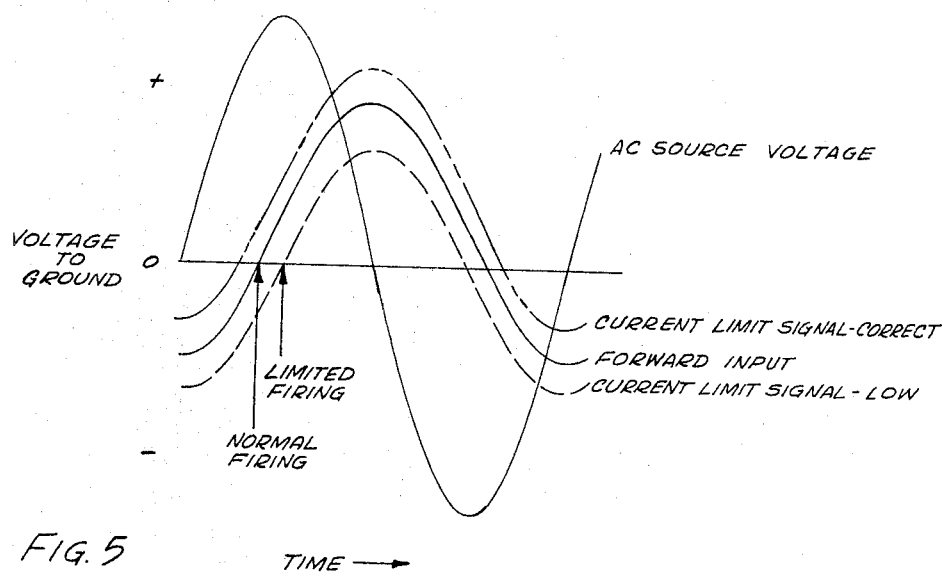

FIGURE 4 shows waveforms where a reverse command signal is provided. This reverse command signal is provided by the movable tap of the command potentiometer 37 being moved upward. This causes the sense reversing transistor 41 to conduct more and cause the command signal bus 43 to become more negative as indicated by the dashed and dotted straight line below or in the negative direction with respect to the zero axis. The composite command signal varies about this forward command signal, and the forward and reverse input signals are biased below and above the composite command signal. The forward input signal never reaches zero or a positive value. However, the reverse input signal reaches zero and becomes relatively negative at a relatively early point in the negative half cycle of the alternating current source voltage so that the reverse control rectifier 15 is fired relatively early in the negative half cycle of the alternating current source voltage. This provides reverse armature current at the indicated time.

It is to be understood that operation for the conditions described continues with time. However, the control rectifiers 14, 15 are respectively cut off whenever the anode voltage becomes negative with respect to the cathods voltage, and are again respectively turned on in appropriate half cycles when the proper firing signals are supplied.

The operation described thus far has omitted the current limit signal supplied on the current limit signal bus 32. (Without the current limit circuit of the invention, a relatively large or excessive average current would be conducted by the forward control rectifier 14 for a command calling for more speed.) The current limit operation will be described in connection with the waveforms shown in FIGURE 5. The current limit signal includes a direct current signal having a polarity and magnitude that indicate the direction and speed of rotation of the motor armature 11 and a phase shifted aletrnating current signal combined with the direct current signal. The added phase shifted alternating current causes the current limit signal to vary about the level set by the back electromotive force. If the motor armature 11 is rotating in the forward direction, its upper terminal is positive relative to its lower terminal. During the time the current limit signal is positive, the diode 70 is forwardly biased and holds the transistor 55 conducting. This causes the transistor 56 to conduct, and therefore reverse current cannot be supplied. The time that the current limit signal becomes positive determines when the forward control circuit may exercise control. If the armature rotates relatively slowly in the forward direction, it produces a relatively small back electromotive force. The current limit signal for a relatively small back electromotive force in the forward direction is shown by the dashed line waveform in FIGURE 5. The command speed is indicated by the forward input waveform. As long as the current limit signal is negative, the transistor 61 is held nonconducting, the transistor 62 conducts, and no forward armature current is provided despite the fact that the forward input signal may otherwise be sufficiently positive to provide forward armature current. When the current limit signal reaches a predetermined positive value later in a half cycle, the diode 69 isolates the current limit signal from the transistor 61, and the forward input signal may take over control of the forward control circuit. Then, the transistor 61 may be made conducting in response to the forward input signal. When the transistor 61 conducts, the transistor 62 becomes nonconducting, and forward armature current is supplied at the limited firing condition indicated. The delay in permitting the forward control circuit to become operative and supply forward armature current limits the average current flow through the forward control rectifier 14. As the armature speed increases in response to the command, the back electromotive force increases in positive magnitude and the current limit signal shifts upward in the positive direction. When the speed is at the commanded magnitude, the current limit signal has a value indicated by the dashed and dotted waveform. The current limit signal becomes sufficiently positive early in the half cycle so that the forward input signal can control the firing and supplying of armature current as indicated.

When the motor armature 11 rotates in the reverse direction, its upper terminal is relatively negative. When the current limit signal is negative, the diode 69 holds the transistor 61 in a nonconducting state. This causes the transistor 62 to conduct and therefore forward current cannot be supplied. At some later time in a half cycle, the current limit signal becomes sufficiently negative so that the diode 70 isolates the current limit signal bus from the transistor 55. The reverse input signal may take over control and cause the transistor 55 to become nonconducting. This causes the transistor 56 to also become nonconducting so that reverse armature current is supplied.

The current limit signal on the current limit signal bus 32 thus provides a signal having a direct current polarity that depends upon the direction of rotation of the armature 11 and having a magnitude dependent upon the speed of this rotation. The current limit signal depends upon the back electromotive force produced by the armature 11, and this in turn determines the amount of average current which can safely be supplied by the forward and reverse control rectifiers 14, 15. As the armature 11 rotates faster in the forward or reverse directions, the diode 69 or the diode 70 permits the forward or reverse control circuit to be controlled by the forward or reverse input signals earlier in the proper half cycles. If the armature 11 rotates slowly, the forward and reverse input signals cannot control the forward and reverse control circuits until later in the proper half cycles. The time in the half cycle at which the control circuits can become effective is governed by the desired current limit value and is varied by the circuit values.

The operation of the circuit as described has also omitted reference to the armature back electromotive feedback signal on the feedback bus 33. This feedback signal preferably has a polarity which opposes the commanded signal polarity in conventional closed feedback loop fashion. Thus, a forward command is provided by the movable tap of the potentiometer 37 being moved in a negative direction. When the armature 11 rotates in the forward direction, the feedback bus 33 becomes more positive. If a reverse command is provided, the movable tap on the potentiometer 37 becomes more positive. When the armature 11 rotates in the reverse direction, the feedback bus 33 becomes more negative. This feedback bus 33 may or may not be used.

The invention has been described in terms of one specific embodiment. However, this embodiment may be varied. For example, the command may be provided by other means such as a discriminator output or other voltage source. The feedback bus 33 may or may not be used. Likewise, the current limit signal may or may not be used. Other firing circuits may be used. And the firing circuits may be coupled to the motor field rather than to the motor armature if suitable control can be effected. Or, the firing circuits may be coupled to the field of a direct current generator to control the magnitude and polarity of a generator output. A single phase shifted source of alternating current can be used for the composite command signal and the current limit signal if proper isolation is provided. And finally, other refinement, such as temperature compensating diodes for various transistors and freewheeling diodes for the pulse transformer windings, may be provided. Therefore, while the invention has been described with reference to a particular embodiment, it is to be understood that modifications may be made without departing from the spirit of the invention or from the scope of the claims.

What I claim as new and desire to secure by Letters Patent of the United States is:

1. A control circuit comprising a source of alternating current, current control means, a load, said current control means coupling said alternating current source to said load to supply forward and reverse currents thereto in response to forward and reverse input signals respectively applied to said current control means, means for generating a direct current command signal having a magnitude and polarity indicative of the desired portion of each half cycle of said alternating current during which said current control means supplies current to said load and the polarity of the current supplied, phase shift means coupled to said source of alternating current to shift the phase thereof, means for combining said direct current command signal with the phase shifted alternating current signal to form a composite command signal, direct current bias means biasing said composite command signal both negative and positive with respect to said direct current command signal to provide forward and reverse command signals, signal control means responsive to said forward and reverse command signals to supply forward and reverse input signals to said current control means, forward input signals being supplied when said forward and reverse command signals are commanded positive and reverse input signals being supplied when said forward and reverse command signals are commanded negative.

2. The control circuit as recited in claim 1, further including bias adjust means coupled to said direct current bias means to simultaneously adjust the magnitude of both the negative and positive bias applied to said composite command signals.

3. A control circuit as recited in claim 2, wherein said load is the armature of the direct current motor.

4. A control circuit as recited in claim 2, wherein said loads is the armature of a direct current motor.

5. A control circuit as recited in claim 3, wherein said current control means includes a pair of back-to-back silicon controlled rectifiers, one of said silicon controlled rectifiers responsive to forward input signals and the other responsive to reverse input signals, and said signal control means includes a forward control circuit and a reverse control circuit, said forward and reverse control circuits being oppositely polarized so that only one control circuit can supply signals to said current control means at any instant in time.

6. A control circuit for a direct current reversible motor comprising a source of alternating current, forward and reverse current control means, said current control means coupling said alternating current source to the armature of said direct current motor to supply forward or reverse currents thereto in response to forward input signals being applied to said forward current control means or reverse input signal being supplied to said reverse current control means, means for generating a direct current voltage having a polarity and magnitude indicative of the desired direction and speed of rotation of said armature, phase shift means coupled to said source of alternating current to provide a first phase shifted signal, means for combining said direct current voltage with said first phase shifted signal to form a composite signal, direct current bias means biasing said composite signal both negative and positive with respect to said direct current voltage, a control circuit responsive to the negatively and positively biased composite signal to supply forward and reverse input signals to said reverse current control means, phase shift means coupled to said source of alternating current to provide a second shifted signal, means coupled to said armature to establish a voltage proportional to the back electromotive force of said motor, combining means combining said second phase shifted signal with the back electromotive force voltage to provide a current limit signal, and coupling means coupling said current limit signal to said control circuit to limit the portion of each half cycle of said alternating current during which forward or reverse input signals can be applied to said current control means.

7. A control circuit for a direct current reversible motor comprising a source of alternating current, forward and reverse current control means, said current control means coupling said alternating current source to the armature of said direct current motor to supply forward or reverse currents thereto in response to forward inputs signals being applied to said forward current control means or reverse input signals being applied to said reverse current control means, means for generating a direct current voltage having a polarity and magnitude indicative of the desired direction and speed of rotation of said armature, an amplifier coupled to receive said direct current voltage, feedback means coupling a voltage indicative of the back electromotive force of said motor from said armature to the input of said amplifier, the output of said amplifier constituting a command signal, phase shift means coupled to said source of alternating current to provide a first phase shifted signal, means for combining said command signal with said first phase shifted signal to form a composite command signal, direct current bias means biasing said composite command signal both negative and positive with respect to said command signal, bias adjust means coupled to said direct current bias means to simultaneously adjust the negative and positive bias applied to said composite command signal, a forward control circuit responsive to the negatively biased composite command signal to supply forward input signals to said forward current control means, a reverse control circuit responsive to the positively biased composite command signal to supply reverse input signals to said reverse current control means, phase shift means coupled to said source of alternating current to provide a second phase shifted signal, means coupled to said armature to establish a voltage proportional to the back electromotive force of said motor, combining means combining said second phase shifted signal with the back electromotive force voltage to produce a current limit signal, and coupling means coupling said current limit signal to each of said control circuits to instantaneously limit the portion of each half cycle of said alternating current during which forward or reverse input signals can be applied to said current control means.

8. A control circuit as recited in claim 7 in which said forward control circuit and said reverse control circuit include oscillators for generating said forward input signals and said reverse input signals, the frequency of these input signals being high compared to the frequency of said alternating current.

References Cited by the Examiner

UNITED STATES PATENTS

| | | | |
|---|---|---|---|
| 3,024,401 | 3/1962 | Dinger | 318—331 X |
| 3,095,534 | 6/1963 | Cockrell | 318—331 X |
| 3,188,542 | 6/1965 | Dietrich. | |

ORIS L. RADER, *Primary Examiner.*

S. GORDON, J. C. BERENZWEIG, *Assistant Examiners.*